United States Patent
Marupaduga

(10) Patent No.: US 11,013,046 B1
(45) Date of Patent: May 18, 2021

(54) DYNAMIC CONTROL OF SECONDARY-CONNECTION ADDITION THRESHOLD BASED ON SECONDARY-CONNECTION ADDITION FAILURES

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,201

(22) Filed: Jan. 9, 2020

(51) Int. Cl.
*H04L 1/06* (2006.01)
*H04W 76/15* (2018.01)
(Continued)

(52) U.S. Cl.
CPC .......... *H04W 76/15* (2018.02); *H04B 17/318* (2015.01); *H04W 24/10* (2013.01);
(Continued)

(58) Field of Classification Search
CPC ... H04W 68/005; H04W 76/27; H04W 48/20; H04W 60/04; H04W 48/16; H04W 24/04;
(Continued)

(56) References Cited

U.S. PATENT DOCUMENTS 9,668,186 B2  5/2017  Zhang et al.
9,894,573 B2  2/2018  Pani et al.
(Continued)

FOREIGN PATENT DOCUMENTS

EP  2 083 587  1/2008
WO  WO 00/38456  6/2000
(Continued)

OTHER PUBLICATIONS

Tweet4technology, "Measurement Control(RRC Connection Reconfiguration) in LTE," printed from the World Wide Web, https://tweet4technology.blogspot.com/2016/11/measurement-controlrrc . . . , dated Nov. 28, 2016.

*Primary Examiner* — Phuoc H Doan

(57) ABSTRACT

A mechanism for controlling configuration of secondary-connectivity for dual connectivity service in a system including a first access node and a second access node. The first access node or another entity detects occurrence of a threshold extent of secondary-connection addition failures involving the second access node, each secondary-connection addition failure comprising failure of a respective attempt to set up secondary air-interface connectivity between a user equipment device (UE) and the second access node for use in dual-connectivity service of the UE. And responsive to at least the detecting, a measurement threshold that the first access node will impose for use in UE evaluation of coverage of the second access node for dual-connectivity setup is dynamically increased from a first coverage-strength value to a stronger second coverage-strength value so as to require stronger coverage of the second access node as a condition for adding secondary-connectivity with the second access node.

20 Claims, 3 Drawing Sheets

(51) Int. Cl.
    *H04W 24/10*     (2009.01)
    *H04B 17/318*    (2015.01)
    *H04W 76/18*     (2018.01)
    *H04W 92/04*     (2009.01)
    *H04W 92/20*     (2009.01)

(52) U.S. Cl.
    CPC .......... *H04W 76/18* (2018.02); *H04W 92/045* (2013.01); *H04W 92/20* (2013.01)

(58) Field of Classification Search
    CPC . H04W 76/18; H04L 41/0668; H04L 43/0817
    See application file for complete search history.

(56) References Cited

U.S. PATENT DOCUMENTS

| | | |
|---|---|---|
| 10,368,253 B2 | 7/2019 | Lei et al. |
| 2012/0040662 A1* | 2/2012 | Rahman ............ H04W 36/0079 |
| | | 455/423 |
| 2018/0249362 A1 | 8/2018 | Kim et al. |
| 2021/0014706 A1* | 1/2021 | Cui .................... H04L 43/0817 |

FOREIGN PATENT DOCUMENTS

| | | |
|---|---|---|
| WO | WO 2016/110432 | 7/2016 |
| WO | WO 2018/23115 | 12/2018 |

\* cited by examiner

DYNAMIC CONTROL OF SECONDARY-CONNECTION ADDITION THRESHOLD BASED ON SECONDARY-CONNECTION ADDITION FAILURES

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels, including resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

In practice, the UE could also regularly evaluate the quality (e.g., based on reference- strength strength) of its coverage from its serving access node and could transmit an associated channel quality indicator (CQI), which the access node could use as a basis to set a modulation and coding scheme (MCS) to be used for downlink and uplink the air-interface communication between the access node and the UE. Higher quality coverage could correspond with a higher-order MCS, which could allow use of fewer air-interface resources (e.g., PRBs) to communicate given bearer data, whereas lower quality coverage could correspond with a lower-order MCS, which could require use of more air-interface resources to communicate given bearer data.

Further, for both the downlink and uplink air-interface communication, if the receiving end does not successfully receive a scheduled data communication from the transmitting end (which might happen if coverage conditions are relatively poor), the receiving end could responsively send to the transmitting end a negative acknowledgement (NACK), and the transmitting end could then responsively engage in re-transmission using air-interface resources of an upcoming subframe.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated, such as in a common cell site for instance, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN, the MN could engage in a process to coordinate setup of dual-connectivity for the UE, so that the UE can be served concurrently by the MN and the SN.

To do so, the MN could first direct the UE to scan for coverage under the second RAT, in an effort to identify sufficiently strong second-RAT coverage for the UE. Here, for instance, the MN could transmit to the UE an RRC signaling message or the like that provides a measurement object (e.g., a B1 measurement object) specifying one or more second-RAT carriers for the UE to scan and specifying, for each carrier, a coverage-strength threshold value against which the UE should compare measured coverage strength on the carrier. The UE could then scan for coverage on each such carrier and upon finding such coverage of an SN could determine if the coverage is at least as strong as the specified threshold. If and when the UE thereby finds sufficiently strong second-RAT coverage of an SN, the UE could then transmit an associated measurement report to the MN, informing the MN that the UE is in sufficiently strong coverage of the SN.

Upon receipt of the UE's measurement report, the MN could then engage in an SN-addition process to add for the UE a second-RAT connection with the SN, so that the MN and SN can then cooperatively provide the UE with dual-connectivity service over their respective connections with the UE.

In an example implementation, for instance, the MN could transmit to the SN an SN-addition request message, providing RRC and DRB configuration information and other information for the second-RAT connection, and the SN could then responsively allocate resources for the second-RAT connection and reply to the MN an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then transmit a random-access signal to the SN, and the SN could respond to the UE with a random-access response message, which could complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the UE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

One technical issue that can arise in the above process is that, once the UE has reported detecting threshold strong coverage of an SN and the MN starts the SN-addition process, the SN-addition process could fail. One reason for SN-addition failure could be the presence of high uplink noise between the UE and the SN, such as interference from nearby small cells or the like, which could prevent the UE's random-access signaling from successfully reaching the SN. That is, even though the UE may have detected threshold strong downlink coverage of the SN, there could be enough uplink noise that the UE may be unable to successfully communicate to the SN.

The present disclosure provides a mechanism that may help to address this problem.

In accordance with the disclosure, an MN could detect occurrence of a threshold extent of SN-addition failures involving a particular SN (e.g., a particular SN on a particular carrier). And in response to detecting occurrence of the threshold extent of SN-addition failures involving the SN, the MN could then responsively adjust the measurement threshold that the MN will provide for UE use in scanning for coverage of the SN. Namely, the MN could responsively increase the measurement threshold so as to require a UE to detect stronger downlink SN coverage as a condition precedent for adding for the UE a secondary connection with the SN.

Requiring stronger downlink SN coverage to justify adding a secondary connection with the SN could help to ensure that a UE's uplink receive signal strength at the SN will be correspondingly strong enough to facilitate successful SN-addition for dual connectivity.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
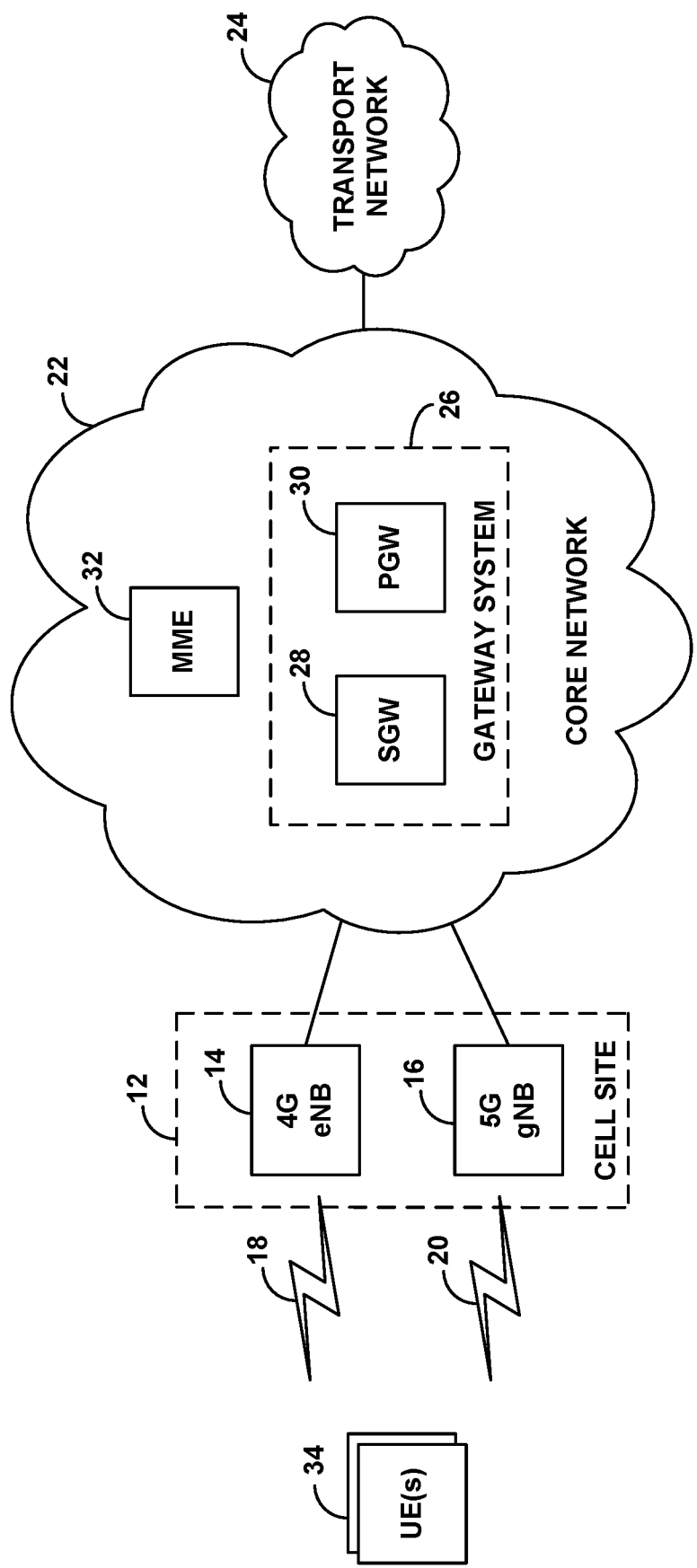
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective antenna structure that is configured to transmit and receive electromagnetic signals in a region defined by an antenna pattern or radiation pattern. The antenna pattern defines a scope of coverage in which the access node can engage in downlink transmission to UEs and receive uplink transmission from UEs. In particular, the antenna pattern may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

In practice, the antenna structures of the access nodes could be collocated with each other, such as by being mounted on a common antenna tower and/or being in a common housing. Further, the azimuth angle, elevation angle, and beamwidth of either or each access node's antenna pattern could be structured so that the two access nodes provide coverage of the same or similar direction and scope as each other, i.e., largely coterminous coverage, even though the access nodes may be operating on different frequencies with different path loss than each other. There could also be some variation between the access nodes' respective coverage areas.

Each access node could provide coverage on one or more carriers according to a respective radio access technology. For instance, the 4G eNB 14 could provide 4G coverage 18 on one or more 4G carriers, and the 5G eNB 16 could provide 5G coverage 20 on one or more 5G carriers.

In an example implementation, the respective coverage on each carrier could be divided over time into frames, subframes, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

In addition, the 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. Other core-network arrangements are also possible.

FIG. 1 also illustrates one or more example UEs 34 within coverage of 4G eNB 14 and 5G gNB 16. Each of these UEs could take any of the forms noted above, among other possibilities. Further, some or all of the UEs could be EN-DC capable, equipped with a 4G LTE radio, a 5G NR radio, and associated circuitry and logic that enables the UEs to engage in 4G LTE service, 5G NR service, and EN-DC service.

In line with the discussion above, when an EN-DC-capable UE initially enters into coverage of this network, the UE could discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE of at least one user-plane bearer. For instance, the MME 32 could engage in signaling with the 4G eNB 14 and the SGW 28 to coordinate setup for the UE of an S1-U packet tunnel between the 4G eNB 14 and the SGW 28, and the SGW 28 could responsively engage in signaling with the PGW 30 to coordinate setup for the UE of an associated packet tunnel between the SGW 28 and the PGW 30. Further, the 4G eNB 14 could engage in signaling with the UE to establish a DRB and other configuration parameters cooperatively defining a 4G connection for the UE.

As a last step of this attachment process, the 4G eNB 14 could also transmit to the UE an RRC message carrying a UE-capability enquiry, and the UE could respond to the 4G eNB 14 with a "UE capability information" information element (IE), which could indicate that the UE is EN-DC capable. Alternatively, the 4G eNB 14 could receive such capability information from the MME, which could obtain the information from a home subscriber server (not shown) or the like.

As the UE is EN-DC capable, the 4G eNB 14 could then work to configure EN-DC service for the UE. In line with the discussion above, for instance, the 4G eNB 14, operating as MeNB, could first transmit to the UE (e.g., in an RRC message) a B1 (inter-RAT) measurement object that directs the UE to scan for coverage of the 5G gNB 16 and/or of one or more carriers on which the 5G gNB 16 operates, and that designates at least one B1 measurement threshold.

Without limitation, the B1 measurement threshold could be a minimum threshold level of reference signal receive power (RSRP) and/or reference signal receive quality (RSRQ) that the UE has from the 5G gNB 16 as a condition for the UE providing a B1 measurement report to the 4G eNB 14. For instance, the B1 measurement threshold could be RSRP on the order of at least −116 decibel-milliwatts (dBm) to −95 dBm. Further, note that the threshold analysis could involve determining whether the detected coverage strength is at least as high as the threshold itself or at least as high as the threshold plus a defined constant, or could involve determining whether the detected coverage strength plus a defined constant is at least as high as the threshold, among other possibilities.

The UE could thus scan for coverage of the 5G gNB 16 and, upon detecting that downlink coverage from the 5G gNB 16 on a particular carrier is at least as strong as the specified B1 measurement threshold, the UE could then transmit to the 4G eNB 14 (e.g., in an RRC message) a measurement report indicating that the UE detected threshold strong coverage of the 5G gNB 16 on that carrier.

Further in line with the discussion above, the 4G eNB 14 could then respond to the UE's measurement report by engaging in a process to add the 5G gNB 16 as an SgNB for the UE. For instance, the 4G eNB 14 could transmit to the 5G gNB 16 an SgNB-Addition request to cause the 5G gNB to allocate resources for a 5G connection for the UE on the carrier, the 4G eNB 14 could receive an SgNB-Addition-Request acknowledge message from the 5G gNB 16, and the 4G eNB 14 could engage in in associated RRC signaling with the UE, in response to which the UE could then transmit to the 5G gNB 16 a random-access signal and the 5G gNB 16 could respond to the UE. Further, the 4G eNB 14 could engage in signaling as described above to transfer to the UE's access bearer to the 5G gNB as well.

The 4G eNB 14 and 5G gNB 16 could then provide the UE with EN-DC service, concurrently serving the UE over their respective connections with the UE. Namely, the 4G eNB 14 could allocate PRBs of its 4G air interface as needed to carry data over the 4G connection between the 4G eNB 14 and the UE, and the 5G gNB 16 could allocate PRBs of its 5G air interface as needed to carry data over the 5G connection between the 5G gNB 16 and the UE.

As noted above, each time the 4G eNB 14 engages in the SgNB-addition process to add for a UE a secondary 5G connection with 5G gNB 16, there is a risk that the SgNB-addition process may fail, possibly due to high uplink noise that prevents the 5G gNB 16 from successfully receiving the UE's random-access signaling, notwithstanding the UE having detected threshold strong downlink coverage from the 5G gNB 16.

In line with the discussion above, the present disclosure provides for addressing this problem by dynamically detecting a threshold extent of such SgNB-addition failures involving the 5G gNB 16 (e.g., on a particular carrier) and responsively adjusting the B1 measurement threshold that the 4G eNB 14 will provide for use by a UE in scanning for threshold strong coverage of the 5G gNB 16 (e.g., on the particular carrier) for use in configuring EN-DC. This process could be carried out by the 4G eNB 14 itself or by another entity (e.g., an element management system (EMS) or the like) working with or on behalf of the 4G eNB 14, among other possibilities.

In an example implementation, the 4G eNB 14 could have a default threshold value for use as a B1 measurement threshold that the 4G eNB 14 would provide to a UE for use by the UE in scanning for coverage of the 5G gNB 16. For instance, the default B1 measurement threshold value could be −95 dBm. The 4G eNB 14 could thus be programmed such that, once an EN-DC-capable UE has connected with the 4G eNB 14, the 4G eNB 14 would provide the UE with a B1 measurement object directing the UE to scan for coverage of the 5G gNB 16 and to report to the 4G eNB 14 if and when the UE detects coverage of the 5G gNB 16 that is at least as strong as −95 dBm.

In response to detecting a threshold extent of SgNB-addition failures involving the 5G gNB 16, the 4G eNB 14 could then automatically change the B1 measurement threshold for the 5G gNB 16 to be a stronger value. For instance, the 4G eNB 14 could change the B1 measurement threshold to −92 dBm, or to some other value that represents stronger coverage than the default B1 threshold by a few dBm or another designated delta deemed to be sufficient to help address the present issue.

Having thus changed the B1 measurement threshold to be the stronger value, the next time an EN-DC-capable UE connects with the 4G eNB 14 and the 4G eNB 14 would provide the UE with a B1 measurement object directing the UE to scan for and report coverage of the 5G gNB 16, the 4G eNB 14 would specify in that measurement object the stronger B1 measurement threshold. That way, the UE would scan for coverage of the 5G gNB 16 and report to the 4G eNB 14 if and when the UE detects coverage of the 5G gNB 16 that is at least as strong as the stronger threshold level. This process could thereby help to increase the likelihood that the UE's uplink random-access signaling to the 5G gNB 16 will succeed, and therefore that the EN-DC setup process will succeed.

Note that the act of increasing the measurement threshold to a stronger value could also be achieved by imposing use of a bias value that decreases UE-measured coverage strength for purposes of the threshold comparison. For instance, if the default threshold is T dBm and the increase delta value would be D dBm so that the increased measurement threshold would be T+D dBm, the process could achieve imposition of that increased measurement threshold by imposing use of a bias that causes a UE to reduce the UE's measured coverage strength by D dBm before comparing with the threshold of T dBm. Other variations could be possible as well.

In the example implementation, the 4G eNB 14 could detect in various ways each of multiple instances of SgNB-addition failures involving the 5G gNB 16.

As one example, the 4G eNB 14 could learn of such a failure by receiving from the 5G gNB 16 a notification of the failure. For instance, each SgNB-addition process to add a secondary connection with the 5G gNB 16 might involve, before the UE sends a random-access request to the 5G gNB 16, the 4G eNB 14 signaling to the 5G gNB 16 to prepare the 5G gNB 16 to serve the UE over a secondary 5G connection. If the 5G gNB 16 does not successfully receive the UE's random-access request after having been directed to prepare for serving the UE, the 5G gNB 16 could deem that to be an SgNB-addition failure and could responsively signal to the 4G eNB 14 (e.g., via an X2 interface) to alert the 4G eNB 14 of the failure. The 4G eNB 14 would thereby learn of the SgNB-addition failure and could record that fact as an instance of SgNB-addition failure involving the 5G gNB 16.

As another example, the 4G eNB 14 could learn of such a failure by receiving from the UE a notification of the failure. For instance, each SgNB-addition process might involve the 4G eNB 14 signaling to the UE to provide the UE with 5G radio-resource information enabling the UE to communicate with the 5G gNB 16, and the UE then responsively transmitting a random-access preamble to the 5G gNB 16. If the UE does not then receive an associated random-access response message from the 5G gNB 16, the UE could deem that to be an SgNB-addition failure and could responsively signal to the 4G eNB 14 (e.g., in an RRC message) to alert the 4G eNB 14 of the failure. The 4G eNB 14 would thereby learn of the SgNB-addition failure and could similarly record that fact as an instance of SgNB-addition failure involving the 5G gNB 16.

The 4G eNB might also or alternatively learn of SgNB-addition failures involving the 5G gNB 16 in other ways as well.

Based on the recorded data indicating the occurrence of one or more such SgNB-addition failures involving the 5G gNB 16, the 4G eNB 14 could then detect the occurrence of a threshold high extent of such failures. Here, the threshold extent could optimally be a quantity N (e.g., at least two) of such failures that is deemed to be problematic, and the 4G eNB 14 might deem the threshold extent of such failures to have occurred if and when the 4G eNB 14 determines that at least the quantity N of such failures have occurred. Further, the 4G eNB 14 could conduct this analysis over a sliding window of time and could compute a rate of SgNB-addition failures involving the 5G gNB 16, and the 4G eNB 14 could detect the occurrence of the threshold extent of such failures by detecting that the rate of such failures is at least as high as a predefined threshold rate that is deemed to be problematic. Other examples may be possible as well.

Once the 4G eNB 14 thus detects the occurrence of a threshold extent of SgNB-addition failures involving the 5G gNB 16, the 4G eNB 14 could then responsively increase to a stronger value the B1 measurement threshold to be used in UE evaluation of coverage of the 5G gNB 16 for EN-DC setup.

Further, in an example implementation, this change of the B1 measurement threshold for use in evaluating coverage of the 5G gNB 16 for EN-DC setup could be temporary. For instance, when the 4G eNB 14 makes this change, the 4G eNB 14 could also set a timer and, upon expiration of the time, could automatically revert to a default B1 measurement threshold value for use in evaluating coverage of the 5G eNB 16 for EN-DC setup. Alternatively, the 4G eNB 14 could apply other triggers for reverting back to the default B1 measurement threshold value or changing to another B1 measurement threshold value.

Still further, the principles described here could also be applied when more than one MN (e.g., more than one 4G eNB) is involved, as the issue may relate principally to uplink reception by the SN (e.g., 5G gNB). Thus, in another implementation, an entity such as an EMS might collect data representing instances of SN-addition failures involving a given SN, even if the instances involve multiple different MNs. And the entity might detect the occurrence of a threshold high extent of such SN-addition failures involving the SN (e.g., on a particular carrier) and might responsively signal to and/or otherwise provision each of one or more MNs to cause each such MN to then direct use of an increased B1 measurement threshold or the like for UE evaluation of SN coverage for use in dual connectivity. Other variations are possible as well.

Figure 2:
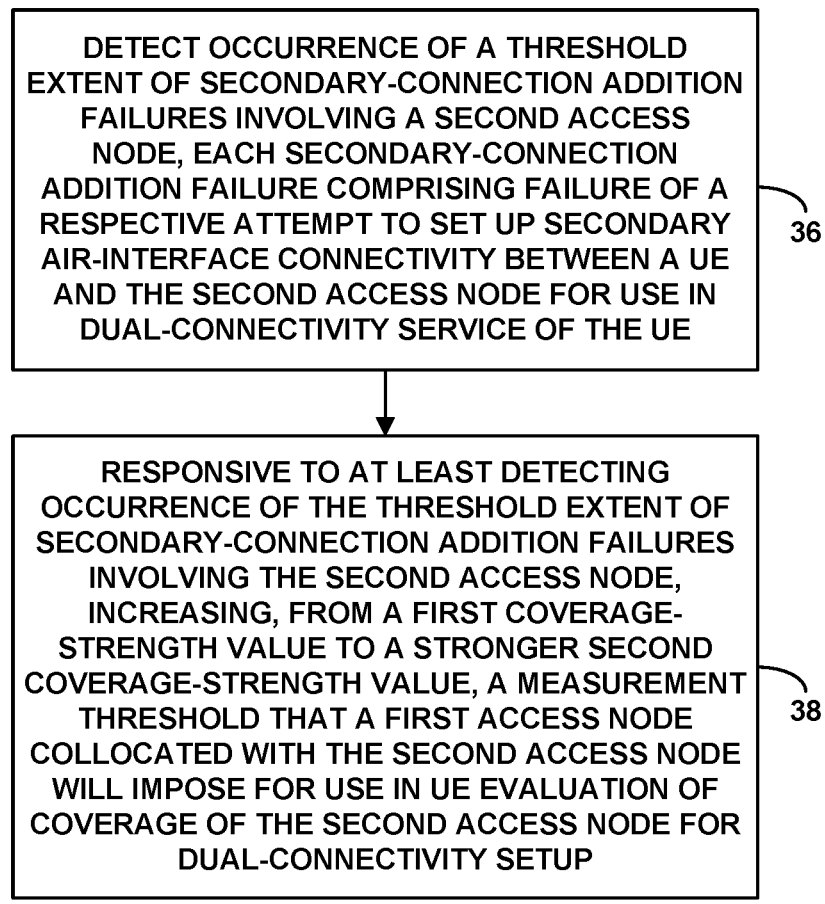
FIG. 2 is a flow chart depicting an example method in accordance with the disclosure.

FIG. 2 is a flow chart depicting an example method that can be carried out to control secondary-connection addition for dual connectivity of a UE. As noted above, this method could be carried out by a first access node, such as by 4G eNB 14, or the method could be carried out by one or more other entities in a system that includes the first access node and a second access node, collocated with each other for instance.

As shown in FIG. 2, at block 36, the method includes detecting occurrence of a threshold extent of secondary-connection addition failures involving the second access node, each secondary-connection addition failure comprising failure of a respective attempt to set up secondary air-interface connectivity between a UE and the second access node for use in dual-connectivity service of the UE. (Here, the failures could all be with respect to the same UE or could be with respect to various different UEs.) At block 38, the method then includes, responsive to at least detecting occurrence of the threshold extent of secondary-connection addition failures involving the second access node, increasing, from a first coverage-strength value to a stronger second coverage-strength value, a measurement threshold that the first access node will impose for use in UE evaluation of coverage of the second access node for dual-connectivity setup.

In line with the discussion above, the act of detecting occurrence of threshold extent of secondary-connection addition failures involving the second access node could involve detecting occurrence of at least a predefined threshold quantity of the secondary-connection addition failures involving the second access node. For instance, the predefined quantity could be a value that is at least two, which could include failures of respective attempts to set up secondary air-interface connectivity for the same UE as each other and/or for different UEs than each other.

Further, as discussed above, the act of detecting occurrence of the threshold extent of secondary-connection addition failures involving the second access node could involve detecting occurrence of the secondary-connection addition failures at a rate at least as high as a predefined threshold rate.

As additionally discussed above, the act of the first access node imposing the measurement threshold for use in UE evaluation of coverage of the second access node for dual-connectivity setup could involve the first access node providing a given UE with a measurement object that directs the given UE to scan for coverage of the second access node and to report to the first access node if and when the given UE detects that coverage of the second access node is at least as strong as the measurement threshold.

Further, as discussed above, the threshold extent of secondary-connection addition failures involving the second access node could involve multiple instances of failure to establish secondary-connectivity with the second access node on a particular carrier. And in that case, the measurement threshold that the first access node will impose for use in UE evaluation of coverage of the second access node for dual-connectivity setup could be a measurement threshold that the first access node will impose for use in UE evaluation of coverage of the second access node specifically on the particular carrier.

Still further, the first access node could be configured with the first coverage-strength value as a default measurement-threshold that the first access node will impose for use in UE evaluation of coverage of the second access node for dual-connectivity setup. And in that case, the act of increasing the measurement threshold that the first access node will impose for use in UE evaluation of coverage of the second access node for dual-connectivity setup could involve reconfiguring the first access node to impose the second coverage-strength value rather than the first coverage-strength value for use in UE evaluation of coverage of second access node for dual-connectivity setup.

By way of example, the first access node could be programmed or have stored data indicating that, when the first access node will send a B1 measurement object to trigger UE scanning for and reporting coverage of the second access node for dual-connectivity setup, the first access node should specify the first coverage-strength threshold as the B1 measurement threshold in the measurement object. And reconfiguring the first access node could then involve changing programming or data in the first access node to indicate instead that, when the first access node will send a B1 measurement object to trigger UE scanning for and reporting coverage of the second access node for dual-connectivity setup, the first access node should specify the first coverage-strength threshold as the B1 measurement threshold in the measurement object.

Yet further, this method could be carried out by an entity other than the first access node, such as by an EMS for instance. And in that case, the act of increasing the measurement threshold could involve transmitting from the entity to the first access node a signaling message to which the first access node is configured to respond by transitioning from (i) being set to impose the first coverage-strength value for use in UE evaluation of coverage of the second access node for dual-connectivity setup to (ii) being set to impose the second coverage-strength value, rather than the first coverage-strength value, for use in UE evaluation of coverage of the second access node for dual-connectivity setup. For instance, an programmed EMS in a core network could transmit the signaling message through the core network to the first access node, and the first access node could be configured to respond accordingly.

And still further, as discussed above, the increase in measurement threshold could be temporary. Thus, for instance, the method could additionally involve, upon expiration of a predefined time period after increasing the measurement threshold from the first coverage-strength value to the second coverage-strength value, automatically reverting the measurement threshold from the second coverage-strength value back to the first coverage-strength value, or so reverting in response to one or more other triggers.

In addition, as discussed above, the dual-connectivity service of the UE could comprise EN-DC, and the dual-connectivity setup could involve EN-DC setup.

Figure 3:
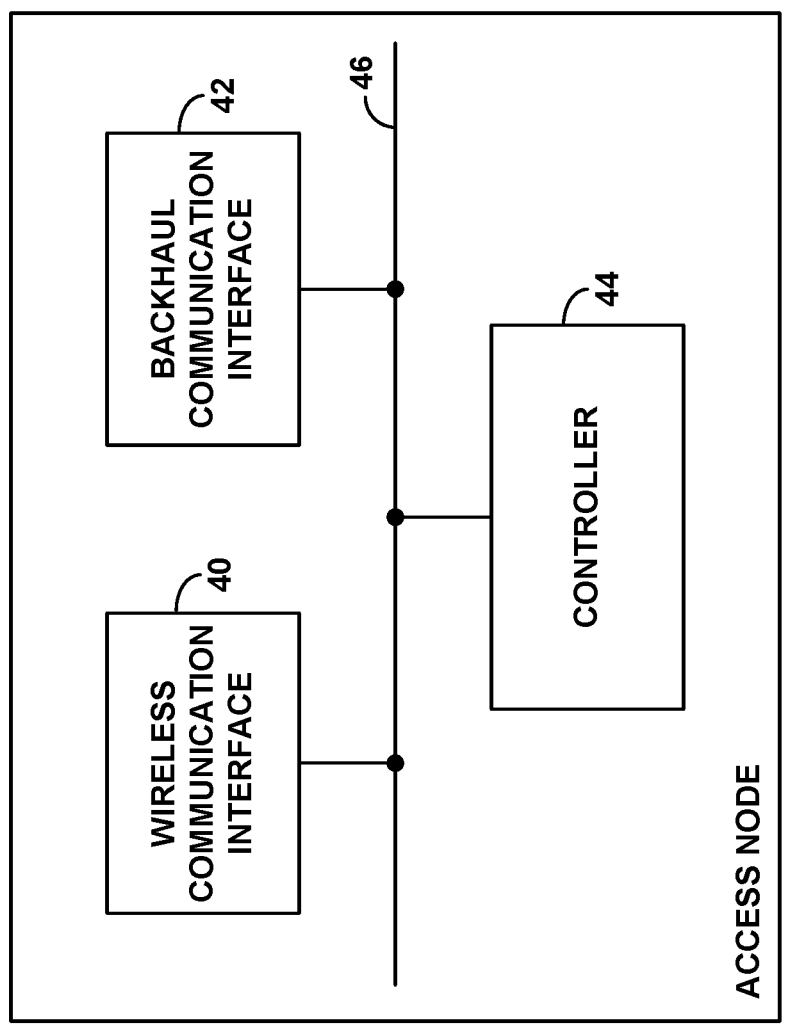
FIG. 3 is a simplified block diagram of an example access node operable in accordance with the disclosure.

FIG. 3 is next a simplified block of an example first access node, such as 4G eNB 14, showing some of the components that could be included in the access node in a non-limiting example implementation. As shown, the example first access node includes a wireless communication interface 40, a backhaul communication interface 42, and a controller 44, which could be integrated together in various ways (e.g., on a chipset) and/or interconnected by a system bus, network, or other communication mechanism 46 as shown.

The wireless communication interface 42 could include a radio and antenna structure through which the first access node could be configured to engage in air-interface communication and serve UEs according to a first RAT. And the backhaul communication interface 44 could comprise a wired or wireless network communication module, such as an Ethernet interface, through which to communicate with other entities, perhaps with a second access node such as 5G gNB 16 and/or with one or more other entities on or via a core network.

Further, the controller 44 could comprise a processing unit (e.g., one or more processing units such as microprocessors and/or specialized processors) and a non-transitory computer-readable medium (e.g., one or more volatile and/or non-volatile storage components, such as magnetic, optical, flash storage, EPROM, EEPROM, or other storage now known or later developed) having stored or otherwise encoded thereon instructions executable by the processing unit to carry out (e.g., cause the first access node to carry out) various operations as described herein.

By way of example, the operations could include detecting occurrence of a threshold extent of secondary-connection addition failures involving a second access node collocated with the first access node, each secondary-connection addition failure comprising failure of a respective attempt to set up secondary UE-connectivity with the second access node according to a second RAT, for use in dual-connectivity service. And the operations could further include, responsive to at least detecting occurrence of the threshold extent of secondary-connection addition failures involving the second access node, increasing, from a first coverage-strength value to a stronger second coverage-strength value, a measurement threshold that the first access node will impose for use in evaluation of coverage of the second access node for dual-connectivity setup.

Various features discussed above can be implemented in this context as well, and vice versa.

The present disclosure also contemplates separately a non-transitory computer-readable medium having encoded thereon program instructions executable to cause a processing unit to carry out operations such as those described above.

For instance, the operations could include detecting occurrence of a threshold extent of secondary-connection addition failures involving a second access node, each secondary-connection addition failure comprising failure of a respective attempt to set up secondary UE-connectivity with the second access node for use in dual-connectivity service provided cooperatively by the second access node and a collocated first access node. And the operations could further include, responsive to at least detecting occurrence of the threshold extent of secondary-connection addition failures involving the second access node, increasing, from a first coverage-strength value to a stronger second coverage-strength value, a measurement threshold that the first access node will impose for use in evaluation of coverage of the second access node for dual-connectivity setup.

Exemplary embodiments have been described above. Those skilled in the art will understand, however, that changes and modifications may be made to these embodiments without departing from the true scope and spirit of the invention.

We claim:

1. A first access node comprising:
a wireless communication interface through which the first access node is configured to engage in air-interface communication according to a first radio access technology (RAT);
a backhaul communication interface; and
a controller configured to carry out operations including (i) detecting occurrence of a threshold extent of secondary-connection addition failures involving a second access node collocated with the first access node, each secondary-connection addition failure comprising failure of a respective attempt to set up secondary UE-connectivity with the second access node according to a second RAT, for use in dual-connectivity service and (ii) responsive to at least detecting occurrence of the threshold extent of secondary-connection addition failures involving the second access node, increasing, from a first coverage-strength value to a stronger second coverage-strength value, a measurement threshold that the first access node will impose for use in evaluation of coverage of the second access node for dual-connectivity setup.

2. The first access node of claim 1, wherein the controller comprises (i) a processing unit and (ii) a non-transitory computer-readable medium having encoded thereon instructions executable by the processing unit to carry out the operations.

3. The first access node of claim 1, wherein detecting occurrence of the threshold extent of secondary-connection addition failures involving the second access node comprises detecting occurrence of at least a predefined threshold quantity of the secondary-connection addition failures involving the second access node.

4. The first access node of claim 1, wherein detecting occurrence of the threshold extent of secondary-connection addition failures involving the second access node comprises detecting occurrence of the secondary-connection addition failures at a rate at least as high as a predefined threshold rate.

5. The first access node of claim 1, wherein the first access node imposing the measurement threshold for use in evaluation of coverage of the second access node for dual-connectivity setup comprises the first access node providing a given UE with a measurement object that directs the given UE to scan for coverage of the second access node and to report to the first access node if and when the given UE detects that coverage of the second access node is at least as strong as the measurement threshold.

6. The first access node of claim 1, wherein the threshold extent of secondary-connection addition failures involving the second access node comprises multiple instances of failure to establish secondary-connectivity with the second access node on a particular carrier, and
wherein the measurement threshold that the first access node will impose for use in evaluation of coverage of the second access node for dual-connectivity setup is a measurement threshold that the first access node will impose for use in evaluation of coverage of the second access node on the particular carrier.

7. The first access node of claim 1,
wherein the first access node is configured with the first coverage-strength value as a default measurement-threshold that the first access node will impose for use in evaluation of coverage of the second access node for dual-connectivity setup, and
wherein increasing the measurement threshold that the first access node will impose for use in evaluation of coverage of the second access node for dual-connectivity setup comprises reconfiguring the first access node to impose the second coverage-strength value rather than the first coverage-strength value for use in evaluation of coverage of second access node for dual-connectivity setup.

8. A method for controlling secondary-connection addition for dual connectivity in a system including a first access node and a second access node, the first access node being collocated with the second access node, the method comprising:
detecting occurrence of a threshold extent of secondary-connection addition failures involving the second access node, each secondary-connection addition failure comprising failure of a respective attempt to set up secondary air-interface connectivity between a user equipment device (UE) and the second access node for use in dual-connectivity service of the UE; and
responsive to at least detecting occurrence of the threshold extent of secondary-connection addition failures involving the second access node, increasing, from a first coverage-strength value to a stronger second coverage-strength value, a measurement threshold that the first access node will impose for use in UE evaluation of coverage of the second access node for dual-connectivity setup.

9. The method of claim 8, wherein detecting occurrence of the threshold extent of secondary-connection addition failures involving the second access node comprises detecting occurrence of at least a predefined threshold quantity of the secondary-connection addition failures involving the second access node.

10. The method of claim 9, wherein the predefined threshold quantity is at least two.

11. The method of claim 10, wherein the at least two secondary-connection addition failures involving the second access node are failures of respective attempts to set up secondary air-interface connectivity for the same UE as each other.

12. The method of claim 8, wherein detecting occurrence of the threshold extent of secondary-connection addition failures involving the second access node comprises detecting occurrence of the secondary-connection addition failures at a rate at least as high as a predefined threshold rate.

13. The method of claim 8, wherein the first access node imposing the measurement threshold for use in UE evaluation of coverage of the second access node for dual-connectivity setup comprises the first access node providing a given UE with a measurement object that directs the given UE to scan for coverage of the second access node and to report to the first access node if and when the given UE detects that coverage of the second access node is at least as strong as the measurement threshold.

14. The method of claim 8, wherein the threshold extent of secondary-connection addition failures involving the second access node comprises multiple instances of failure to establish secondary-connectivity with the second access node on a particular carrier, and
wherein the measurement threshold that the first access node will impose for use in UE evaluation of coverage of the second access node for dual-connectivity setup is a measurement threshold that the first access node will impose for use in UE evaluation of coverage of the second access node on the particular carrier.

15. The method of claim 8,
wherein the first access node is configured with the first coverage-strength value as a default measurement-threshold that the first access node will impose for use in UE evaluation of coverage of the second access node for dual-connectivity setup, and
wherein increasing the measurement threshold that the first access node will impose for use in UE evaluation of coverage of the second access node for dual-connectivity setup comprises reconfiguring the first access node to impose the second coverage-strength value rather than the first coverage-strength value for use in UE evaluation of coverage of second access node for dual-connectivity setup.

16. The method of claim 8, wherein the method is carried out by an entity other than the first access node, and wherein increasing the measurement threshold comprises transmitting from the entity to the first access node a signaling message to which the first access node is configured to respond by transitioning from (i) being set to impose the first coverage-strength value for use in UE evaluation of coverage of the second access node for dual-connectivity setup to (ii) being set to impose the second coverage-strength value, rather than the first coverage-strength value, for use in UE evaluation of coverage of the second access node for dual-connectivity setup.

17. The method of claim 8, wherein the measurement threshold is a B1 measurement threshold.

18. The method of claim 8, further comprising:
upon expiration of a predefined time period after the increasing, automatically reverting, from the second coverage-strength value back to the first coverage-strength value, the measurement threshold that the first access node will impose for use in UE evaluation of coverage of the second access node for dual-connectivity setup.

19. The method of claim 8, wherein the dual-connectivity service of the UE comprises EUTRA-NR dual connectivity (EN-DC), and wherein the dual-connectivity setup comprises EN-DC setup.

20. A non-transitory computer readable medium, having encoded thereon instructions executable by a processing unit to carry out operations comprising:
detecting occurrence of a threshold extent of secondary-connection addition failures involving a second access node, each secondary-connection addition failure comprising failure of a respective attempt to set up secondary UE-connectivity with the second access node for use in dual-connectivity service provided cooperatively by the second access node and a collocated first access node; and
responsive to at least detecting occurrence of the threshold extent of secondary-connection addition failures involving the second access node, increasing, from a first coverage-strength value to a stronger second coverage-strength value, a measurement threshold that the first access node will impose for use in evaluation of coverage of the second access node for dual-connectivity setup.

* * * * *